United States Patent
Ohyama

(10) Patent No.: US 7,246,403 B2
(45) Date of Patent: Jul. 24, 2007

(54) WIPER WITH LIGHT EMITTER

(75) Inventor: Yoshisuke Ohyama, Saitama-ken (JP)

(73) Assignee: Y.Corporation, Tokyo (JP)

( * ) Notice: Subject to any disclaimer, the term of this patent is extended or adjusted under 35 U.S.C. 154(b) by 10 days.

(21) Appl. No.: 10/481,592

(22) PCT Filed: Jun. 21, 2001

(86) PCT No.: PCT/JP01/05309

§ 371 (c)(1),
(2), (4) Date: Apr. 14, 2004

(87) PCT Pub. No.: WO03/000524

PCT Pub. Date: Jan. 3, 2003

(65) Prior Publication Data

US 2004/0177466 A1     Sep. 16, 2004

(51) Int. Cl.
*B60S 1/04* (2006.01)
*B60S 1/34* (2006.01)
*B60Q 1/26* (2006.01)

(52) U.S. Cl. .......................... 15/250.351; 15/250.001; 340/468; 362/503; 362/487

(58) Field of Classification Search ........... 15/250.001, 15/250.351, 250.48, 250.201, 250.41; 362/487, 362/503; 340/468, 471, 472, 473, 479
See application file for complete search history.

(56) References Cited

U.S. PATENT DOCUMENTS

| | | | | |
|---|---|---|---|---|
| 2,650,355 A | * | 8/1953 | Pieczonka | 362/540 |
| 5,276,937 A | * | 1/1994 | Lan | 15/257.01 |
| 5,305,190 A | * | 4/1994 | Clement | 362/503 |
| 5,867,094 A | * | 2/1999 | Tonne | 340/468 |
| 6,353,961 B1 | * | 3/2002 | Lin | 15/250.001 |

FOREIGN PATENT DOCUMENTS

| | | |
|---|---|---|
| JP | 1-223052 | 9/1989 |
| JP | 3-9955 | 1/1991 |
| JP | 6-156198 | 6/1994 |
| JP | 3069729 | 4/2000 |

* cited by examiner

*Primary Examiner*—Gary K. Graham
(74) *Attorney, Agent, or Firm*—Jacobson Holman PLLC

(57) ABSTRACT

A wiper with a light emitter formed by providing a light emitting function to a wiper for wiping off a wiped surface, the wiper including a linear light emitting part visible from the outside disposed on the outside of a wiper blade or a wiper arm for wiping operation and a light shielding device provided on the wiper along the light emitting part so that a person positioned on the inside of the wiped surface is not obstructed visually by the light beam emitted from the light emitting part.

1 Claim, 4 Drawing Sheets

(a)    (b)

(a)

(b)

WIPER WITH LIGHT EMITTER

This is a nationalization of PCT/JP01/05309 filed Jun. 21, 2001 and published in Japanese.

TECHNICAL FIELD

The present invention relates to a wiper with a light emitter.

BACKGROUND ART

When considering a traffic accident countermeasure for instance, in an individual level it becomes important to nullify a self-cause, take a prevention action, and so forth. Whereupon, it is recommended to call attention of a succeeding car and the like, and it has become a habit to flicker a hazard lamp in a tail of stagnation and, further, there has been performed such a matter as to devise a position and a shape of a stop lamp. Under such circumstances, the inventor found that a dynamic display of lamplight was effective, and has forwarded researches by paying attention to giving a light emitting function to the wiper.

There has been already proposed an invention or device for causing the wiper to have a function of reflecting the lamplight of the succeeding car and the like or, more positively, the light emitting function. For example, in JP-UM-A-3-9955, there is made a device in which a lamp is attached to a rear wiper of a car. In the case of this device, since the lamp is exposed on the wiper and thus a brightness of the lamp extends to the periphery, it cannot be used in a place other than the rear wiper. Further, in the case of the lamp, its size is determined by a kind of light source, so that there is no room for change.

In contrast to this, an invention of JP-UM-A-6-156198 takes a constitution in which an outer face of a wiper arm is equipped with an elongated shape light emitting body, and this is applied not only to a window wiper of a front side but also to one of a rear side. For the light emitting body, there are used elongated sheet-like one of electroluminescence, and one in which plural light emitting diodes are arranged in a bar-like form. Among these, the electroluminescence sheet is dark, insufficient in its luminance and expensive, and thus cannot be said to be a suitable material at present. On the other hand, the light emitting diodes are high in their luminance and did not become such a degree as to be said expensive, but if they are arranged in the bar-like form, the number becomes large and their weight must be taken into consideration, so that they are not practical.

DISCLOSURE OF THE INVENTION

The invention is one made in view of the aforesaid points, and its problem is to make a dynamic display by a linear light emitting part possible. Further, other problem of the invention is to provide a wiper with a light emitter, whose visually attractive power asking one's attention for the circumferences is high and which is easy to be perceived even from a long distance as the wiper for a vehicle, especially for an automobile.

The invention for solving the above problems is one in which such a means is adopted that a linear light emitting part viewable from an outside is disposed in an outer face of a wiper blade or a wiper arm for a wiping operation, and a light shielding means is provided in a wiper along the light emitting part such that a person positioning inside a wiped surface is not visually obstructed by a light emission of the light emitting part.

A wiper with a light emitting unit according to the invention is one in which a light emitting function is possessed in the wiper wiping the wiped surface. In many cases, as to the wiped surface, a windshield of an automobile, a railway vehicle and the like, i.e., a transparent face demanded to be clean like a window glass and the windshield, are made an object. The wiper is a device wiping off the wiped surface, and one having a wiper arm portion and a wiper blade portion attached to a tip of the former is general. However, in the invention, it is called "wiper" as a whole irrespective of whatever structure it has. Accordingly, all places of such a wiper become places for attaching the light emitting unit. The light emitting function of the light emitting unit in the invention is possessed in the above wiper, but one which seems as if it glints by receiving a light from others is outside the object, and it must be one which glints by emitting the light by itself.

In the invention, the linear light emitting part is provided in the outer face of the wiper blade or the wiper arm, i.e., position viewable from the outside. The light emitting part must not only emit the light by itself but also have a linear form. The linear light emitting part is demanded to be as small and light in weight as possible because it is attached to the wiper in order to be moved together with a wiper operation. Accordingly, for example, dotted chain-like one in which many light emitting diodes are arranged is not suitable as the light emitting part of the invention. However, one in which a linear light emitting part exists and a spot light source is combined with the former, one-dot chain line-like or two-dot chain line-like one in which a spot light source and a spot light source are connected by a linear light emitting part, broken line-like one in which short lines are intermittently disposed, or the like corresponds to the linear light emitting part.

As an example of the light emitting part, it is possible to take a constitution obtaining a linear light emitting state by using a light emitting diode (LED) that is a light source and a light conducting member like an optical fiber transmitting a light emission of the light emitting diode, and disposing light emitting member(s) in at least one end or both ends of the light conducting member. By this, the linear light emitting part can be formed by using the spot light source-like light emitting diode and, also as to colors of the light source, three colors of red, green and blue are ready, so that a degree of freedom is high because a combination of these colors is possible. Incidentally, it is unnecessary that the optical fiber is high precision one for communication, and also a light conducting transparent resin molded material can be used.

The linear light emitting part is easily viewable from the outside and, on the other hand, combined with the wiper such that the person positioning inside the wiped surface to be wiped by the wiper is not subjected to a visual obstruction by the light emission of the light emitting part. Therefore, the light shielding means for the person positioning inside the wiped surface is provided in the wiper along the light emitting part. The light shielding means surely prevents the light of the light emitting part from turning to eyes of the inside person in order to be safe even in a case where the unit of the invention is applied to the wiper of a front windshield of an automobile, and is provided so as not to become a hindrance to ensuring a field of view. As an example of the light shielding means, there are contained one of a constitution of a hood and a wall-like form which prevent a light leak, and one of an optical constitution like a convex lens preventing a diffusion of the light by its convergence.

BEST MODE FOR CARRYING OUT THE INVENTION

Figure 1:
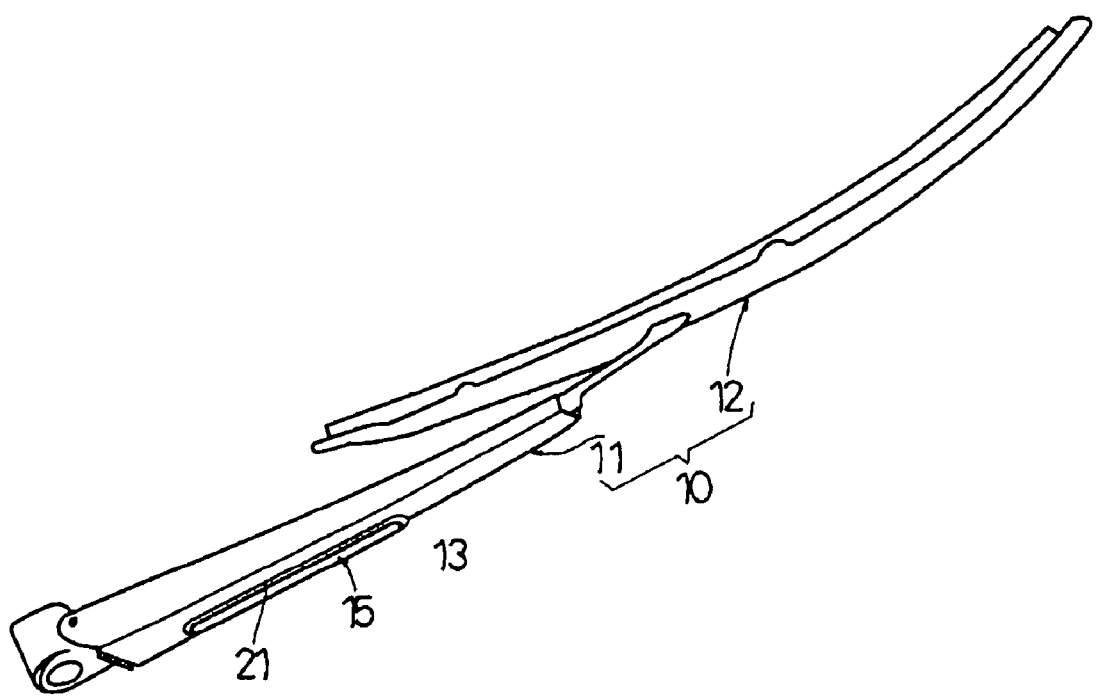
[FIG. 1] A perspective view showing an embodiment 1 of a wiper with a light emitter according to the invention.
Figure 2:
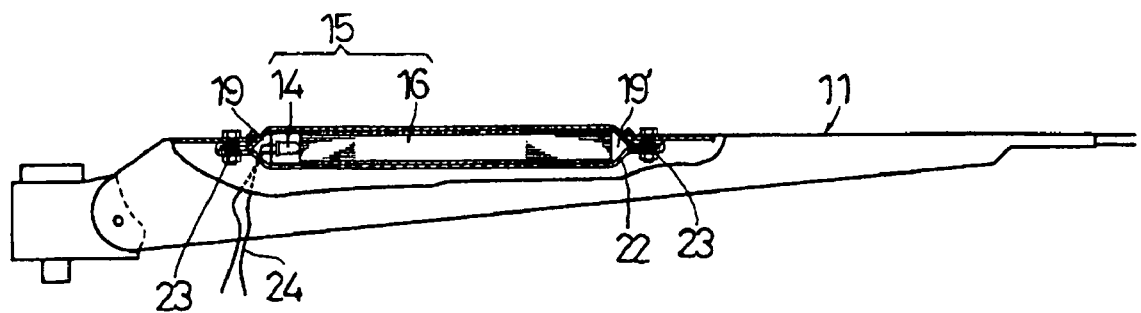
[FIG. 2] An enlarged side view in which a main part of FIG. 1 is broken.
Figure 3:
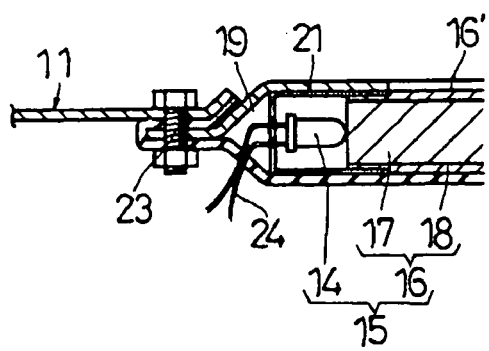
[FIG. 3]
(a) A main part longitudinal sectional view.
(b) A main part cross-sectional view.
Figure 3:
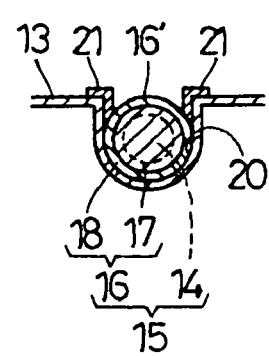

Hereunder, the invention is more detailedly explained by referring to embodiments shown in the drawings. FIG. 1, FIG. 2 and FIG. 3 are ones showing a wiper 10 with a light emitter (emitting unit) of an embodiment 1, and the wiper 10 is constituted from a wiper arm 11, and a wiper blade 12 attached to a tip of the wiper arm.

A light emitting part 15 is provided in an outer face of the wiper arm 11 such that a light can be projected in a predetermined direction outside the wiper 10. The light emitting part 15 is incorporated into an attaching part 13 formed in an elongated manner along a longitudinal direction of the wiper arm 11 and, as a device constitution, is one in which a light emitting diode that is a spot-like light source 14 and a flexible plastic rod or cord as a light conducting member 16 are combined. As the light emitting diode, a red LED lamp is provided only in an end part 19 of a root side of the light conducting member wiper arm 11. It is of course that the light can be emitted from both sides by providing the light emitting diode also in a front end part 19'. Also as to the color, it is not limited to the red and may be other color, or it may take a form of mixed color by disposing different color LED lamps in both ends.

The light emitting part 15 exemplified in FIG. 1 uses an achromatic transparent linear material 17 referred to as flexible rod made of plastic, and is one in which one in which a protective material 18 has been overlapped on an outer periphery of the linear material is constituted as the light conducting member 16. The light conducting member 16 is held in an attaching part 20 provided in the wiper arm 11, and its one part 16' protrudes slightly outward than an outer face of the wiper arm 11 (FIG. 3(a)), and is adapted such that the light of the light emitting part 15 can be oriented more clearly to an aimed direction. And further, an exposed one part of the light conducting member 16 has, as a light shielding means 21, a protruded bank-like hood in an edge along a wiper longitudinal direction. The linear material 17 has a flexibility and, even under a curved state, develops a light emitting effect similar to a straight line.

In the case of the embodiment 1, since the light emitting part 15 is accommodated in a case 22 and the case 22 is attached to the wiper arm 11 by fasteners 23 represented by screws, it suffices if only the attaching port 13 is prepared in the wiper arm 11 as the attaching part. The light source 14 is connected to a power source circuit by a cord 24 and, by incorporating a lighting control circuit as occasion demands, it is possible to perform, for example, an ON/OFF of the light emission, a luminance adjustment, a control of the light emission and the luminance, which interlock with a brake lamp, and the like.

As to the wiper 10 with the light emitter of the embodiment 1 constituted in this manner, the linear light of the light emitting part 15 is generated toward the aimed direction such as, for example, a front or a rear of the vehicle to which the wiper 10 has been attached, so that no light turns and leaks to places other than the front or the rear. Therefore, it follows that in the front there is shown an existence of one's own car mainly to a car running in the opposite direction and a walker, and in the rear there is appealed the existence of one's own car mainly to the succeeding car. Additionally, by a lighting mode interlocking with a foot brake, the fact that one's own car is intending to decelerate or stop can be informed to surroundings. These are helpful to form a traffic order about one's own car, and very effective for preventing an accident.

Figure 4:
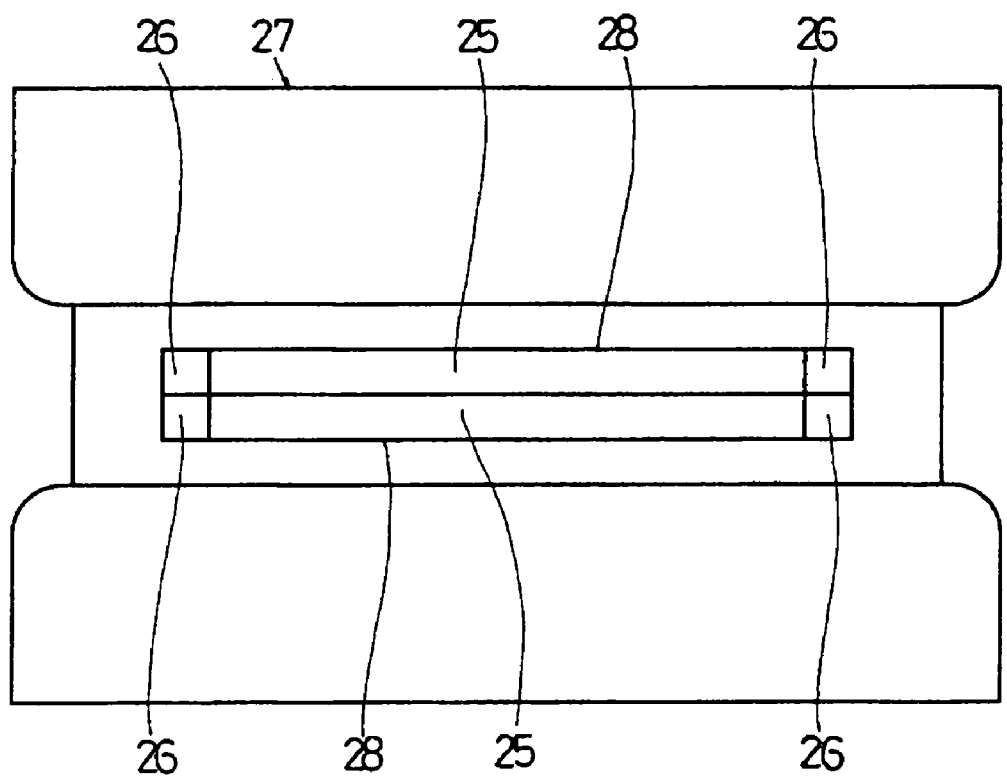
[FIG. 4] A development of a light emitting part attaching part of an embodiment 2 of the same.
Figure 5:
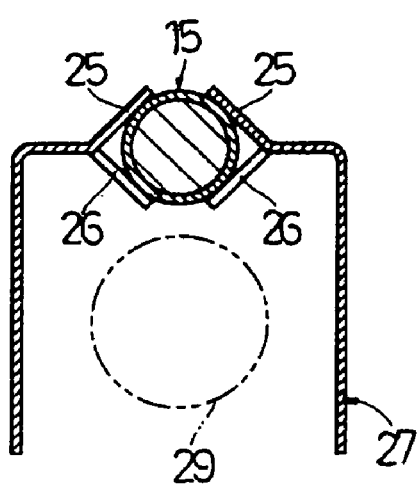
[FIG. 5]
(a) A cross-sectional view showing a work example 1 of the one of FIG. 4.
(b) A cross-sectional view showing a work example 2 of the one of FIG. 4.
Figure 5:
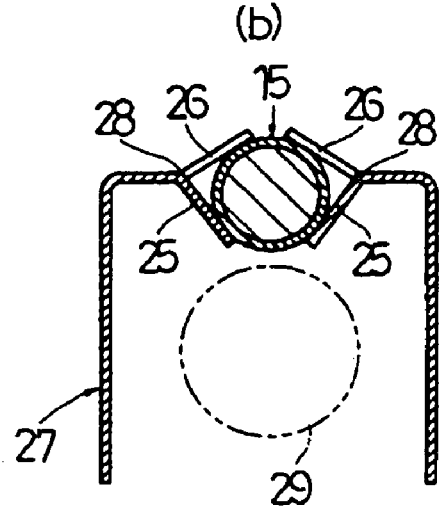

FIG. 4 and FIG. 5 are ones showing an embodiment 2 of the wiper 10 according to the invention, and it has a characteristic about a mode of the attaching part of the light emitting part 15. FIG. 4 is a development of a light emitting part attaching member 27, and it is constituted such that a bending piece becoming a holder piece holding the linear light emitting part 15 and a bending piece becoming a light shielding means becoming a hood piece for the light emitting part 15 being held can be obtained in a center part by a press working. Each bending piece is divided into a long bending piece 25 somewhat shorter than a length of the light emitting part 15 and short bending pieces 26, 26 located in both ends in a longitudinal direction of the long bending piece, and there is such an intention that one of them is bent downward (inside) and the other of them is bent upward (outside), and both the pieces 25, 26 are used for holding and light-shielding the light emitting part 15.

FIG. 5(a) is one in which the long bending piece 25 is bent upward and made the hood, and the short bending piece 26 is bent downward and made the holder piece. FIG. 5(b) is one in which conversely the long bending piece 25 is bent downward and made the holder piece, and the short bending piece 26 is bent upward and made the mating holder piece. In the example of FIG. 5(a) expecting a light shielding effect by the bending piece 25, the light emitting part 15 is protruded more outward and, in the example of FIG. 5(b) not expecting it, there is taken a mode in which the light emitting part 15 is disposed inward and a bending edge 28 is made the hood. The light emitting part attaching member 27 is bent such that its section becomes a gate shape, and can be formed as one part of the wiper arm 11. However, on the other hand, there may be taken a form in which only an opening corresponding to the attaching port 13 is formed in the wiper arm 11 similarly to the embodiment 1, and an assembly of the light emitting unit in which the light emitting part 15 has been incorporated into the light emitting part attaching member 27 formed as a separate member is combined with the wiper 10. 29 shows a position of a spring for raising/lowering the wiper arm 11.

Also in the one of the embodiment 2 of FIG. 4 and FIG. 5, the light emitting part 15 emits the light to the aimed direction, and there is no fear that the light of the light emitting part 15 is turned to directions and places other than that direction. That is, it is possible to obtain the same action as the case of the embodiment 1.

Figure 6:
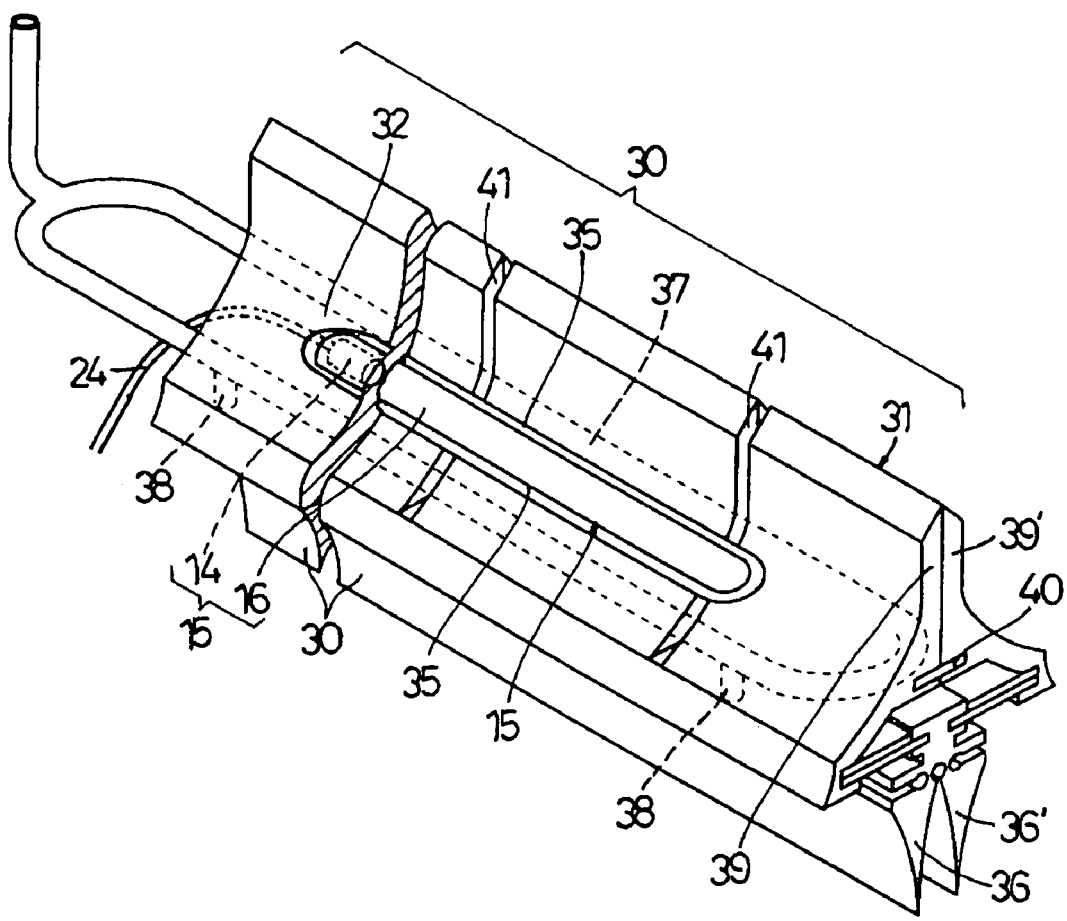
[FIG. 6] A perspective view showing an embodiment 3 of the same.
Figure 7:
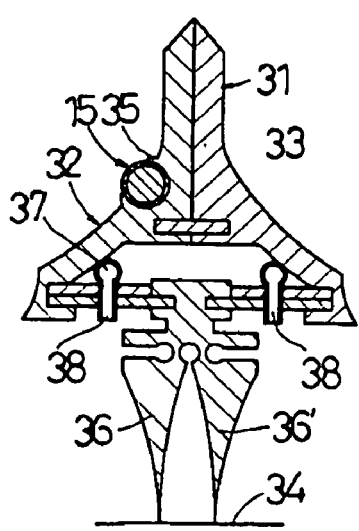
[FIG. 7] A cross-sectional view in a nozzle part of the one of FIG. 6.

FIG. 6 and FIG. 7 are ones showing an embodiment 3 of a wiper 30 according to the invention, and show an example in which the light emitting unit is directly attached in a portion of a blade holder 31 holding the wiper blade. The blade holder 31 has a flexibility, has a constitution flexible following, together with a blade part, a curved face existing in a windshield of the wiped surface, and moreover is shown as one of a double blade system.

In the case of the embodiment 3, the linear light emitting part 15 is attached to a concave hole 33 formed in a front (outer) slant face 32 of the blade holder 31 having a triangle sectional shape (FIG. 7). Here, "front" means a side subjected to such an action that, for example, a wind pressure applied to an automobile running forward pushes the wiper 10 to a wiped surface 34. The light emitting part 15 is attached so as to be fitted to the concave hole 33 and, in an outer edge of the concave hole 33, a protruded bank-like hood is formed monolithically with the blade holder 31 along the longitudinal direction as a light shielding means 35. The fact that the light emitting part 15 is linear one comprising the light source 14 and the light conducting member 16 as mentioned above is similar to the cases of the embodiments 1 and 2.

The wiper 30 of the embodiment 3 has two blades 36, 36', these are made one body in their base parts, and it is adapted such that a cleaning fluid can be supplied to the wiped surface through a nozzle 38 from a window washer fluid passage 37 provided inside. The blade holder 31 comprises front/rear two members 39, 39', and they are made one body in a bonding part 40. In each of the front/rear members 39, 39', notches 41 are formed with their positions being shifted, and they are provided such that the blade parts 36, 36' are easy to flex following the wiped surface.

Also in the embodiment 3, the linear light is emitted toward the front from the light emitting part 15 and, moreover by the triangle shape blade holder 31 and the light shielding means 35 provided therein, the light directed to the front is prevented from turning to other direction. Further, the blade holder 31 having the triangular sectional shape becomes so as to be pushed to the wiped surface 34 by the wind pressure applied to the slant face 32 as the automobile to which the unit concerned has been attached becomes a high speed, but even if it becomes such a state it is stable by the two blades 36, 36', so that also the linear light emitting part 15 does not fluctuate and thus a stable display state is held.

In this manner, since the wiper with the light emitter (emitting unit) according to the invention can constitute a red lamp wiper by changing the wiper into such an induction rod lighting a red light as used, for example, by a road administrator, an evident viewing ability is obtained by a large rotation operation. Especially, in the case of the invention, since the linear light emitting part 15 is constituted by combining the spot light source 14 such as light emitting diodes and the light conducting member 16 such as optical fibers, there is a characteristic that a load of the wiper is not increased because it is light weight and, when mounting, no large scale design change is required only by forming the attaching port. Further, the light conducting member 16 becomes free in its length, also as to the spot light source 14 it may be in both ends or one end and other optional combination is possible, and as to the lighting control such a matter can be easily performed that it is interlocked by being connected to a lighting circuit of brake lamps, besides an ON/OFF by a manual operation.

Industrial Applicability

Since the invention is one constituted and acting as mentioned above, the dynamic display by the linear light emitting part becomes possible and it is bright and has a high visually attractive power for the surroundings, and moreover since the person such as driver positioning inside the wiped surface is not disturbed by the light emission, it can be applied not only to a rear wiper but also to a front wiper, a safety is extremely increased because the existence of one's own car can be informed to the walker and the front car under a bad weather and similarly it is possible to call attention of the succeeding car, so that a practically remarkable effect is brought about in combination with the fact that an implementation is easy.

The invention claimed is:

1. A wiper for a vehicle having a light emitter with a light emitting function, said wiper comprising
   a linear light emitting part viewable from an outside of the vehicle and disposed in a case in a wiper arm for a wiping operation, and
   a light shielding means provided along the light emitting part including, at least in part, the case surrounding one side and both ends of the light emitting part such that a person positioned inside the vehicle is not visually obstructed by a light emission of the light emitting part, the light emitting part including a light emitting diode and an optical fiber, said optical fiber transmitting light emitted by the light emitting diode, and a linear light emitting state being obtained by disposing the light emitting diode at least at one end of the optical fiber,
   case being held in place by two fasteners located at the both ends of the light emitting part.

\* \* \* \* \*